Patented Feb. 4, 1936

2,029,663

UNITED STATES PATENT OFFICE 2,029,663

RECOVERY OF PHOSPHORUS FROM DILUTE GASES

Friedrich P. Kerschbaum, Frankfort-on-the-Main, Germany, William H. Waggaman, Baltimore, Md., and Stapleton D. Gooch, Pembroke, Fla., assignors, by mesne assignments, to Pembroke Chemical Corporation, a corporation of Florida No Drawing. Application November 8, 1930, Serial No. 494,442. Renewed August 10, 1934

1 Claim. (Cl. 23—223)

This invention relates to the production of phosphorus and more particularly to the production of phosphorus by pyrolytic reduction of phosphate in a blast furnace.

There are two general methods of recovering phosphorus by the pyrolytic method. The first method comprises volatilizing phosphorus in an electric furnace, under reducing conditions, from a phosphate-silica charge.

In the second method, the displacement of the phosphorus is secured by heating the phosphate silica mixture in a blast furnace.

In each method it is necessary to remove the phosphorus from the furnace gases. In this second operation the problem of removal of phosphorus from the blast furnace gases is a difficult one and differs considerably from the electric furnace method. In the blast furnace operation, the high temperatures required are generated by the combustion of carbonaceous fuel mixed with the charge. This is done by forcing highly preheated air through tuyères in the base of the furnace. The issuing gases, therefore, contain phosphorus in, so to speak, high dilution. This dilution is due to the large quantities of carbon monoxide and nitrogen produced by the combustion of the fuel. These effluent gases, therefore, seldom contain over one and one-half grams of phosphorus per cubic foot of gas at normal temperatures and pressures.

The blast furnace operation, therefore, is markedly different from the electric furnace process in respect to the recovery step. In the electric furnace, the heat is generated by an electric current and no fuel for heating purposes is required. The concentration of phosphorus in the effluent gases is therefore much greater than in the blast furnace operation.

It has generally been supposed that to remove phosphorus from gases dilute with respect to this element it is necessary to pass the gases through a condensing system of relatively large dimensions to insure a velocity of flow sufficiently low and a time sufficiently long to insure complete precipitation or condensation of the phosphorus. Many prior methods of recovery have therefore been based on this assumption.

It is an object of the present invention to provide a simple and effective method of removing phosphorus from gases dilute with respect to this element.

Another object is to provide a method of effectively removing phosphorus from the combustion gases of a blast furnace reduction process.

Yet another object is to efficiently remove phosphorus from gases which are dilute with respect to this element without utilizing complicated apparatus.

A further object is to remove phosphorus from gases in relatively large particle size.

With these and other equally important objects in view, the invention comprehends the idea of subjecting phosphorus containing gases to a direct cooling action under controlled conditions of temperature and time so as to substantially completely precipitate the phosphorus content.

As indicated above, it had been thought that a low velocity of flow and a protracted cooling period were necesasry to insure complete precipitation of phosphorus from gases containing it. We have found, however, that such conditions are not essential, but that a complete contacting with a cooling medium such as water or an aqueous solution will condense or precipitate the element substantially completely, and that furthermore the phosphorus may be separated out as relatively large particles.

To accomplish this separation and recovery of the phosphorus, certain conditions must be fulfilled. In order to insure the complete removal of the phosphorus content, the bulk of the cooling medium, or at least the part containing the chief amount of phosphorus condensed, should be recirculated, so as to insure coalescence of the particles of phosphorus and avoid the loss which would result in immediately discharging the cooling medium containing some phosphorus in fine suspension. This coalescence of the smaller particles of phosphorus may be accelerated, as described hereinafter, by dissolving a suitable electrolyte in the cooling medium.

A second condition which should be fulfilled in order to secure the optimum results is the provision of a plurality of condensing units which function to progressively step down or reduce the temperature of the gases containing the phosphorus, at the same time permitting the use of different and separate systems of recirculating condensing media. It will be understood of course, that this plurality of condensing units in effect is a plurality of condensing stages, in which a thermal differential is maintained. Therefore, in carrying out the process, the gases may be successively passed through separate condensers or through a single condenser in which several distinct thermal stages are maintained. This gradual reduction or diminution in the temperature, together with the recirculation of the liquid condensing media, insures the precipitation of the phosphorus in relatively large particles, and therefore tends to minimize or obviate the possibility of smaller phosphorus particles remaining in suspension in the condensing medium.

The final condition which should be fulfilled in carrying out the process is the provision for a final condensing action wherein the temperature of the condensing medium is reduced to such an extent that the vapor pressure of the residual phosphorus is practically negligible. When such conditions are fulfilled, we have found that despite the high dilution of the phosphorus, with respect to its gaseous vehicle, a substantially quantitative recovery of phosphorus may be secured, and that furthermore, this is thrown down as relatively large aggregates in a form which may be readily handled and which can readily be converted into phosphorus pentoxide.

Broadly considered the increase in size of the phosphorus particles is achieved by insuring, in the gaseous phase, those conditions which conduce to increasing the particle size by condensation. This is effected by lowering the temperature well below the dew point and thus increasing the size of the phosphorus particles by distillation. While it is preferable to step down the temperature in stages this is not absolutely essential. The essential factor is that the phosphorus must be kept in contact with gases supersaturated with respect to the phosphorus vapor tension for a requisite period of time.

When these two steps are combined, that is to say, when the phosphorus is contacted with the supersaturated gases for the requisite period and the cooling medium is recirculated a substantially complete condensation of phosphorus is effected in a very short time.

As indicated above, the time of exposure of the gases to the action of the recirculating cooling medium is an important feature of the invention. This time may vary considerably depending on the particular conditions of a given run and more especially upon the concentration of phosphorus in the gases passing through the condensing apparatus. In the case of phosphorus containing gases from a blast furnace having a concentration of from 20–50 grams of phosphorus per cubic meter it has been found that the time of exposure or contact may be varied from ten minutes down to about a half a minute. In treating electric furnace gases, in which the concentration is about ten times as great, the period of contact may be considerably shorter. By intensive spraying of the gases with a cooling medium the condensation of the phosphorus may be effected in a limited period of time and in apparatus of relatively small volume.

In carrying out the process, the gases issuing from the blast furnace, for example, are preferably first passed through a dust catcher of any suitable or conventional design and then to the first of a series of condensing stages. As noted above, these separate condensing stages may be embodied in separate condenser units, or may be incorporated in a single element.

Such a condenser may consist simply of a cylindrical chamber, the height of which is considerably greater than the diameter. The cylinder is closed at the top, but provided with a gas drawoff at the upper portion. The bottom is preferably immersed below the level of a body of water contained in the trough or receptacle so as, in effect, to form a liquid seal and provide a vehicle for the collection of the phosphorus condensed within the element. If desired, the condenser unit may comprise a bubble tower construction having a series of vertical pans provided with downcomers and risers, so that the inflowing gases contact intimately with the cooling medium flowing downwardly and countercurrently. This type of condenser, or any other suitable type which will subserve the functions defined herein, may be employed.

For example, the furnace gases are admitted to the condenser through a suitable inlet line positioned on the side and near the bottom, but above the liquid level of the seal. In passing upwardly, these gases are contacted with the recirculating water maintained at a temperature above 100° F. If desired, the temperature of this cooling water may be controlled by passing it through a suitable heating coil. However, in the described operation, it is quite unnecessary to preheat this cooling water, because of the elevated temperature of the large volume of gas normally issuing from the blast furnace heats up the circulated liquid medium. Hence, the contact of the hot gases with the cooling water automatically raises and maintains the temperature of the water above the melting point of the phosphorus. The temperature of the incoming gases, by this treatment, is reduced appreciably below the dew point of the phosphorus and yet the maintenance of this temperature causes the phosphorus particles to coalesce, so that they will settle as large aggregates within a relatively short period of time.

In order to increase the speed of condensation or precipitation, a predetermined quantity of an electrolyte may be added to the cooling water. The salt added is chosen so as to provide an ion which is charged oppositely to the phosphorus. As is known, the ions of high valency are the most active precipitants.

In actual practice it has been found that the gases from the furnace bring with them, or produce in contact with the circulating aqueous system, such electrolytes as fluorine compounds, phosphoric acid, etc.

From the first condenser, the gases are then passed through a second condenser of similar design, where they are sprayed with recirculating water or electrolyte, or with a mixture of recirculating water and fresh water, or with fresh water alone for direct cooling purposes. Preferably, the temperature of the water in the second condenser is maintained between 90° and 110° F. This second lowering of the temperature of the gas further reduces the vapor pressure of the phosphorus, and as a result a large portion of the phosphorus which was maintained in vapor form in the first condenser is transformed into a solid and precipitated out in the second chamber. As in the operation carried out in the first condensing stage, the cooling water may be continuously recirculated so as not only to effect a thorough cooling of the gas, but also to provide a sufficient period of time for the agglomeration or coagulation of the smaller particles of phosphorus, and to insure their settling or precipitation.

After treatment in the second condensing stage, the temperature of the gases has been considerably reduced and the bulk of the phosphorus is therefore separated out. However, the volume of the gases from blast furnace operation is so large that the actual quantity of phosphorus carried in the form of vapor is considerable, and hence may necessitate a further reduction in temperature to remove the final traces of the element. In order to accomplish this, the gases are passed through a third condenser which may be of any suitable design or of the scrubber type. In this last element, the condensing water is introduced at a temperature not higher than 80° F. At such temperatures, the vapor pressure of phosphorus is so low and the contacting with water is so thorough that substantially all of this element is removed.

It will be noted, therefore, that the operation described while adapted generally for the recovery of phosphorus from a gas is peculiarly applicable to treatment of blast furnace gases for the recovery of the phosphorus contained therein. The gradual stepping down of the temperature permits of the treatment of large volumes of gas without, however, necessitating the use of apparatus of great capacity. The provision of recirculation of the wash water, or electrolyte, obviates the danger of losses of the smaller phosphorus particles. The provision of incorporating precipitants in the wash water not only insures the removal of the phosphorus from the aqueous suspensions, but presents the additional advantage of throwing this down in large particle size. It is to be noted in addition that by using a recirculating medium, employment is made of the suspension of finely divided phosphorus as condensation nuclei for additional phosphorus. It will be appreciated that this fact could be utilized by adding finely divided phosphorus or other condensation nuclei to the recirculating medium at any desired point.

The phosphorus which is separated and collected in the various condensing units may be run by gravity or pumped to a common receptacle where it is either reduced to a liquid form and then burned to $P_2O_5$, or it may be delivered in the form of a wet sludge to a phosphorus burner, burned to $P_2O_5$ and condensed as phosphoric acid. This method presents a means of preparing strong phosphoric acid from phosphorus produced by blast furnace treatment in which the phosphorus is substantially completely removed by a simple and economical method.

While we have described the preferred embodiment of the invention, it is to be understood that this is given as typifying similar equivalent methods of performing the same result, and hence we do not intend to be limited to the method described, except as such limitations are clearly imposed by the appended claim.

We claim:

A process of removing phosphorus from blast furnace gases relatively dilute in this element, comprising passing the gases relatively slowly through a series of condensers, spraying the gases with water, in each condenser, maintained at progressively lower temperatures, rapidly recirculating the bulk of water in the first condenser so as to insure a recontacting of a given quantity of gas with the recirculating medium, maintaining the water in the first condenser at temperatures between 110° to 212° F., maintaining the water in the second condenser at temperatures between 65° and 110° F. and maintaining the water in the final condenser at temperatures between 32° to 65° F.

FRIEDRICH P. KERSCHBAUM.
WILLIAM H. WAGGAMAN.
STAPLETON D. GOOCH.